(12) United States Patent
Mori et al.

(10) Patent No.: US 9,303,968 B2
(45) Date of Patent: Apr. 5, 2016

(54) LEVER TYPE MEASURING MACHINE

(71) Applicant: MITUTOYO CORPORATION, Kanagawa (JP)

(72) Inventors: Yasunori Mori, Kure (JP); Takeshi Yamamoto, Zama (JP); Atsushi Shimaoka, Kawasaki (JP); Tomoyuki Miyazaki, Kawasaki (JP); Kazuhiko Hidaka, Hino (JP)

(73) Assignee: MITUTOYO CORPORATION, Kanagawa (JP)

( * ) Notice: Subject to any disclaimer, the term of this patent is extended or adjusted under 35 U.S.C. 154(b) by 86 days.

(21) Appl. No.: 14/483,753

(22) Filed: Sep. 11, 2014

(65) Prior Publication Data

US 2015/0075020 A1    Mar. 19, 2015

(30) Foreign Application Priority Data

Sep. 18, 2013   (JP) ................ 2013-192798

(51) Int. Cl.
| | | |
|---|---|---|
| *G01B 5/28* | (2006.01) | |
| *G01B 5/20* | (2006.01) | |
| *G01B 3/00* | (2006.01) | |
| *G01B 5/008* | (2006.01) | |

(52) U.S. Cl.
CPC  *G01B 5/20* (2013.01); *G01B 3/008* (2013.01); *G01B 5/008* (2013.01); *G01B 5/28* (2013.01)

(58) Field of Classification Search
CPC ............ G01B 5/20; G01B 5/28; G01B 3/008; G01B 5/008
USPC .................................. 33/556, 559, 533, 832
See application file for complete search history.

(56) References Cited

U.S. PATENT DOCUMENTS

| | | | | |
|---|---|---|---|---|
| 2002/0066198 | A1* | 6/2002 | Schopf .................... | G01B 5/012 33/559 |
| 2007/0062057 | A1* | 3/2007 | Schopf .................... | G01B 7/06 33/561 |
| 2007/0192052 | A1* | 8/2007 | Goto ........................ | G01B 5/28 702/95 |
| 2008/0134534 | A1* | 6/2008 | Sasaki .................... | G01B 5/012 33/556 |
| 2010/0165309 | A1* | 7/2010 | Kamiyama ......... | G03F 7/70775 355/30 |
| 2012/0010826 | A1* | 1/2012 | Mishima .................. | G01B 5/28 702/34 |
| 2014/0237834 | A1* | 8/2014 | Matsumiya ............. | G01B 7/34 33/503 |
| 2014/0283402 | A1* | 9/2014 | Hidaka .................... | G01B 5/20 33/556 |
| 2014/0326057 | A1* | 11/2014 | Nakayama ........... | G01B 21/047 73/105 |

FOREIGN PATENT DOCUMENTS

JP         2001-241905        7/2001

* cited by examiner

*Primary Examiner* — G. Bradley Bennett
(74) *Attorney, Agent, or Firm* — Greenblum & Bernstein, P.L.C.

(57) ABSTRACT

A lever-type measuring machine swinging around a supporting point includes a stylus measuring a shape of a measured object, an arm having a first end connected to the stylus and a second end connected to the supporting point, and a balancer having a first end connected to the supporting point. The balancer is formed of a material having high specific flexural rigidity. The lever-type measuring machine enables more accurate measurement.

9 Claims, 6 Drawing Sheets

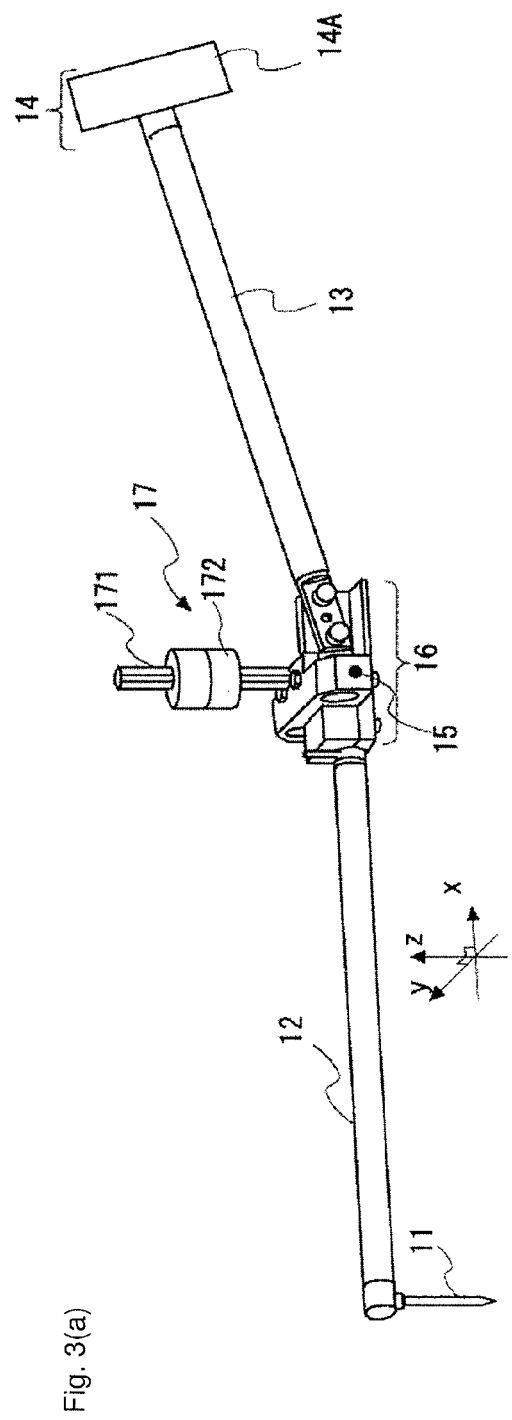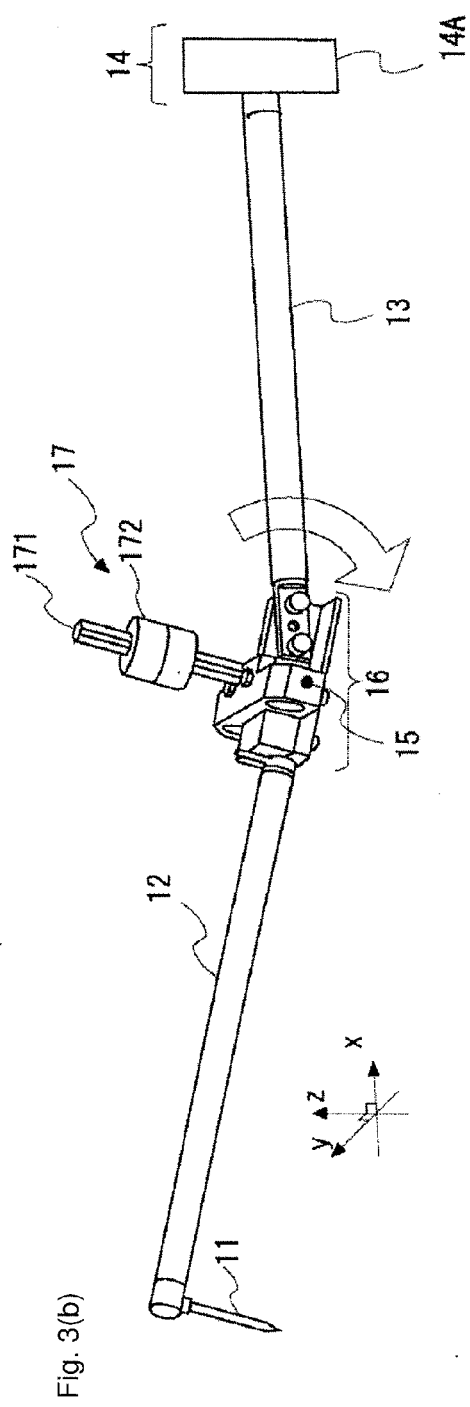
Fig. 3(a)
Fig. 3(b)

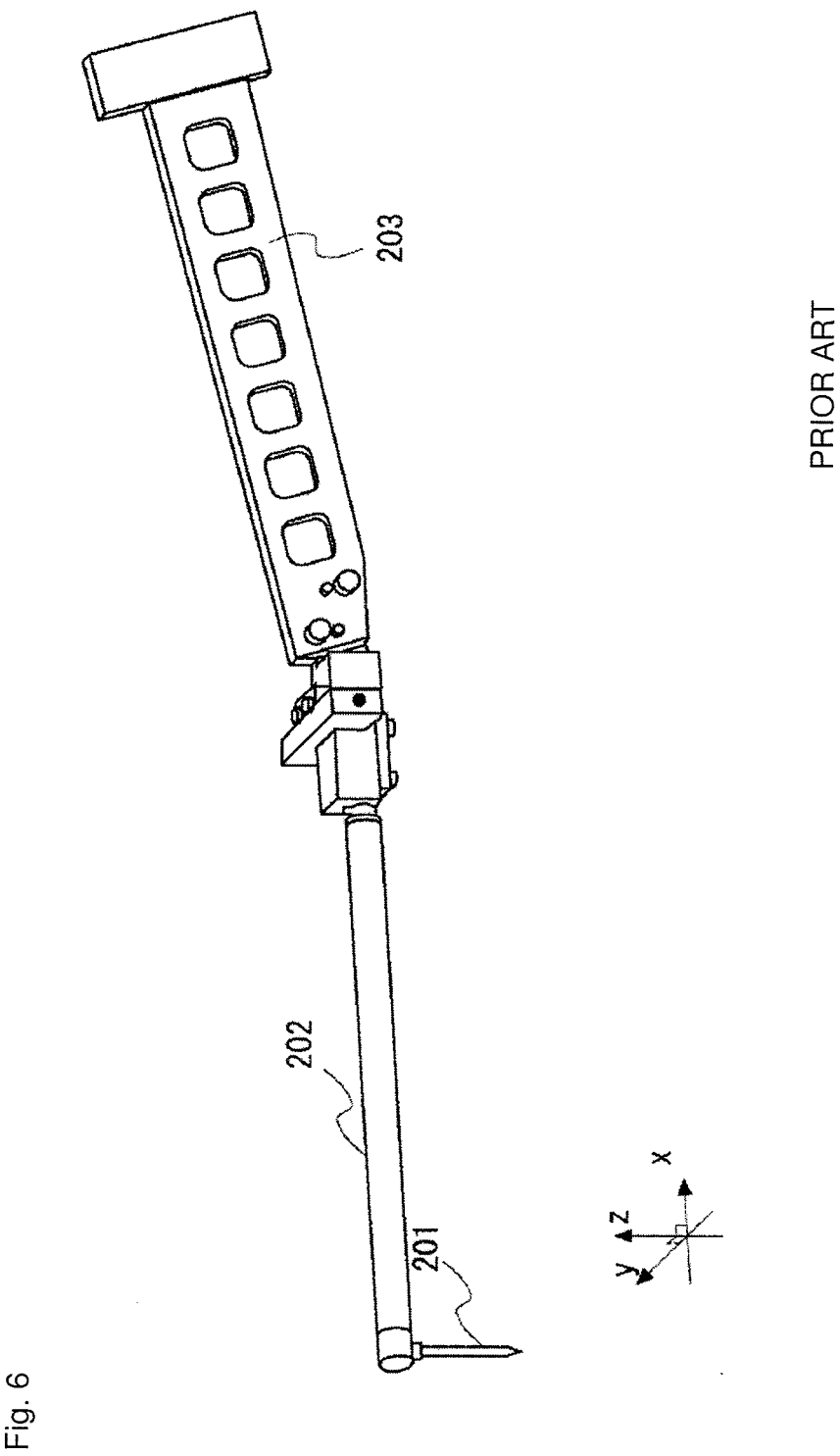
Fig. 6       PRIOR ART

LEVER TYPE MEASURING MACHINE

CROSS-REFERENCE TO RELATED APPLICATIONS

The present application claims priority under 35 U.S.C. §119 of Japanese Application No. 2013-192798 filed on Sep. 18, 2013, the disclosure of which is expressly incorporated by reference herein in its entirety.

BACKGROUND OF THE INVENTION

1. Field of the Invention

The present invention relates to a lever-type measuring machine.

2. Description of Related Art

A lever-type measuring machine is known for measuring a shape or surface roughness of a machine-tooled workpiece. To measure a shape of an object, the lever-type measuring machine has a gauge head, an arm, and a balancer, the gauge head being substantially perpendicularly brought into contact with a surface of the object, the arm having the gauge head fixated thereto, the balancer supporting the arm.

In a technology disclosed in Japanese Patent Laid-Open No. 2001-241905, for example, a stylus of a detector is brought into contact with a peripheral surface of a workpiece and the detector is rotated to measure roughness of the peripheral surface of the workpiece. The detector disclosed in Japanese Patent Laid-Open No. 2001-241905 is swingably supported by a rotation axis member rotationally driven by a drive member. The detector has a balance weight that counterbalances the detector around a supporting point.

The contact-type measuring machine is configured such that the stylus swings up and down centering the supporting point. Thus, in order to improve accuracy of the contact-type measuring machine, swing responsiveness of the stylus with respect to unevenness of the surface of the object needs to be improved.

A known lever-type measuring machine for better responsiveness has a ceramic arm. FIG. 6 is an overview of a lever-type measuring machine having conventionally an arm portion composed of a ceramic. A lever-type measuring machine 200 has a stylus 201, an arm 202, and a balancer 203. The balancer 203 is composed of an easily processed metal, such as aluminum.

In the lever-type measuring machine 200, the arm 202 is composed of a ceramic. The arm 202 is lighter than an arm composed of a metal or metal compound. Accordingly, the balancer 203 connected to the arm 202 is also reduced in weight to counterbalance the arm 202. The balancer 203 composed of a metal or the like is generally processed so as to be thin in a longitudinal direction.

However, vibration is likely to be generated in the thin direction of the thin balancer 203. When vibration is generated in the balancer 203, the vibration is transmitted from the balancer 203 to the arm 202 and from the arm 202 to the stylus 201, thus affecting measurement.

SUMMARY OF THE INVENTION

In view of the circumstances above, the present invention provides a lever-type measuring machine achieving more accurate measurement.

An aspect of the present invention provides a lever-type measuring machine swinging around a supporting point, including a stylus measuring a shape of a measured object, an arm having a first end connected to the stylus and a second end connected to the supporting point, and a balancer having a first end connected to the supporting point. The balancer is formed of a material having high specific flexural rigidity. This reduces vibration generated in the balancer.

In the lever-type measuring machine according to the present invention, the material having high specific flexural rigidity is preferably a material having specific flexural rigidity greater than that of an aluminum. This further reduces the vibration.

In the lever-type measuring machine according to the present invention, the balancer is preferably composed of one of a ceramic, a carbon resin, and a magnesium alloy. This enables further reduction in the vibration.

In the lever-type measuring machine according to the present invention, the arm is preferably composed of a ceramic, a carbon resin, and a magnesium alloy. This achieves more accurate measurement.

In the lever-type measuring machine according to the present invention, the arm and the balancer may be an integrally formed one-piece member. This reduces the number of components.

In the lever-type measuring machine according to the present invention, a balance adjustment mechanism is preferably further provided at the supporting point. This further improves accuracy of the lever-type measuring machine.

Furthermore, the balance adjustment mechanism preferably includes a support pillar connected in a direction perpendicularly above the supporting point so as to define substantially a right angle with the arm, and a weight provided to the intermediate portion of the support pillar. This brings the stylus into contact with the measured object with a more appropriate measurement force.

In the lever-type measuring machine according to the present invention, a weight is preferably further provided to an intermediate portion of the arm. This further improves the accuracy of the lever-type measuring machine.

According to the lever-type measuring machine of the present invention, more accurate measurement can be performed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3(*a*) and 3(*b*) are each a side view of a lever-type measuring machine according to a third embodiment;

FIG. 6 is an overview of a conventional lever-type measuring machine having a ceramic arm.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

Embodiments of the present invention are described below with reference to the drawings. A lever-type measuring machine according to the present invention is applied as a portion of a measuring apparatus.

Figure 1:
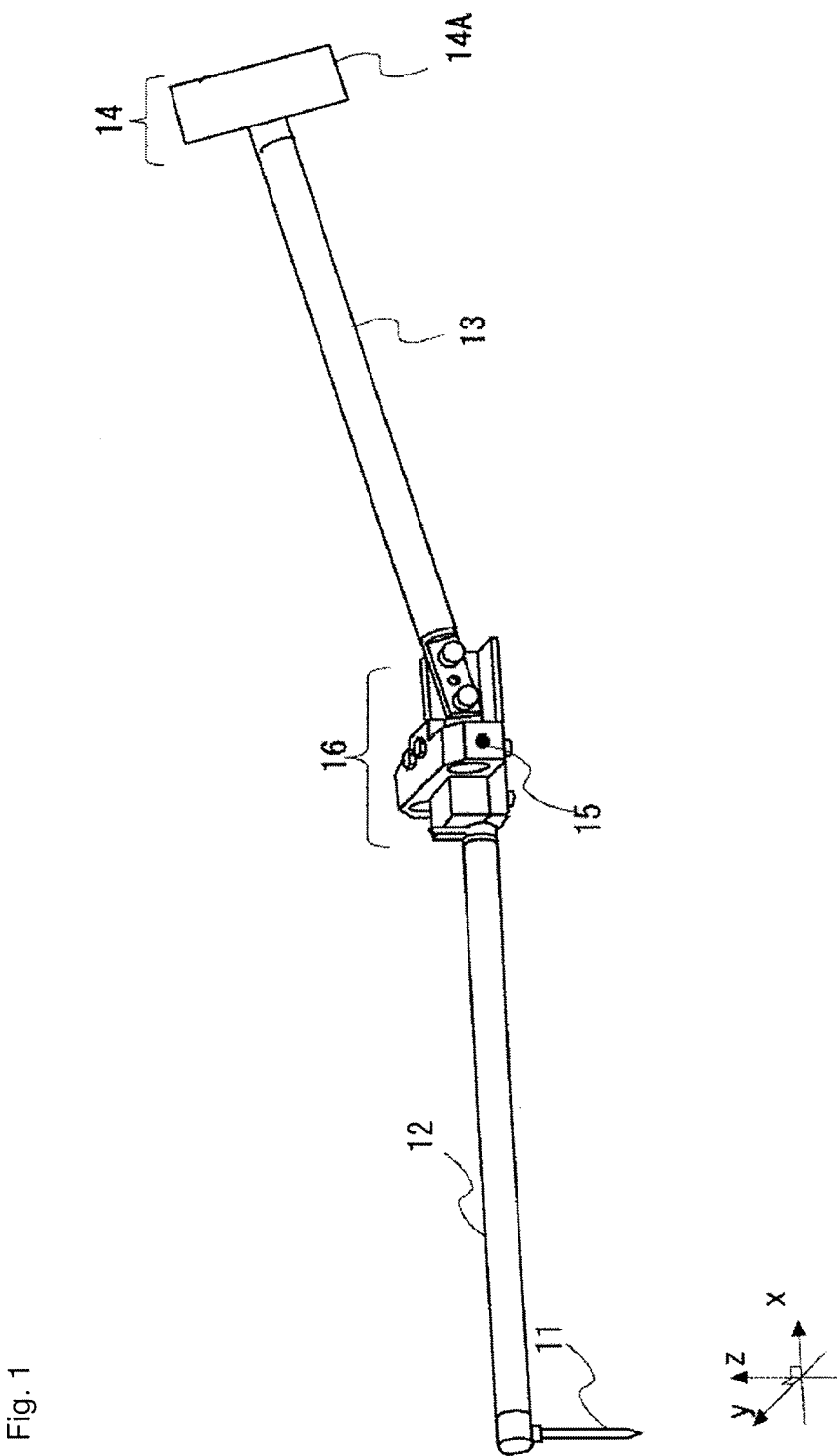
FIG. 1 is a side view of a lever-type measuring machine according to a first embodiment.

FIG. 1 is a side view of a lever-type measuring machine according to the present embodiment. A lever-type measuring machine 1 has a stylus 11, an arm 12, a balancer 13, and a displacement detector 14. The lever-type measuring machine 1 measures a shape of a measured object by bringing the stylus 11 into contact with the measured object. In FIG. 1, a depth direction relative to a plane of paper is defined as a positive Y-axis direction. In addition, in FIG. 1, a direction toward the right on the plane of paper is defined as a positive X-axis direction. Furthermore, a positive Z-axis direction is referred to as upward and a negative Z-axis direction as downward, as required.

The lever-type measuring machine 1 is swingable around a rotation supporting point 15 of a joint 16 as a supporting point. With the rotation supporting point 15 as the supporting point, the arm 12 is provided on a first side and the balancer 13 is provided on a second side.

The arm 12 is composed of a member having high specific flexural rigidity. The material having high specific flexural rigidity herein is a material having specific flexural rigidity of an aluminum, which is a specific flexural rigidity of 0.015 $(MPa)^{1/3}$ $(kg/m^3)$ or greater. In the present embodiment, the arm 12 is composed of a ceramic. The arm 12 is connected to the stylus 11 at a first end and to the joint 16 at a second end. The arm 12 is provided so as to define a right angle with the stylus 11. With reference to FIG. 1, when a longitudinal direction of the stylus 11 is parallel with the Z axis, the arm 12 is substantially parallel with the X axis. The arm 12 is composed of a ceramic.

The balancer 13 is composed of a member having high specific flexural rigidity. The material having high specific flexural rigidity herein is a material having specific flexural rigidity of an aluminum, which is a specific flexural rigidity of 0.015 $(MPa)^{1/3}$ $(kg/m^3)$ or greater. In the present embodiment, the balancer 13 is composed of a ceramic. The balancer 13 is provided on an opposite side from the arm 12 centering the rotation supporting point 15. The balancer 13 is connected to the joint 16 at a first end. The balancer 13 is connected to the displacement detector 14 at a second end.

The displacement detector 14 detects a circular momentum (displacement amount in the Z-axis direction) of the arm 12. The displacement detector 14 has a scale 14A and a detection head 14B (not shown in the drawing). The scale 14A has scale marks (not shown in the drawing) curved in a direction of a circular movement of the arm 12. The detection head 14B is provided opposite to the scale 14A at the second end of the balancer 13. The circular movement of the arm 12 is detected by the detection head 14B, which then outputs, to a measuring apparatus (not shown in the drawing), a pulse signal having a number associated with the circular momentum of the arm 12 (displacement detection pulse signal).

The lever-type measuring machine 1, which has the arm 12 composed of a ceramic, has better responsiveness of the stylus 11 to the measured object. However, self-weight of the arm 12 is less than an arm composed of a metal, such as aluminum.

The balancer 13, which is conventionally composed of a metal, is reduced in thickness to counterbalance the arm. Reducing the thickness of the metal balancer, however, is likely to cause vibration in a direction in which the thickness is reduced. The vibration in the balancer deteriorates the responsiveness of the stylus 11. To improve the performance of the measuring machine, it is desired to reduce the vibration in the balancer as much as possible. In order to reduce the vibration, the balancer could be modified such that the longitudinal length thereof is shortened. With the shortened balancer, however, the displacement at the second end of the balancer 13 is reduced relative to the displacement of the stylus 11, thus making detection with the displacement detector 14 difficult.

In the lever-type measuring machine 1 according to the present embodiment, both the arm 12 and the balancer 13 are composed of the materials having high specific flexural rigidity. This limits such problems as the vibration generated in the balancer composed of a metal, such as aluminum, and the decline in responsiveness, thus achieving more accurate measurement.

In addition, there is a case where a magnetic biasing device (not shown in the drawing) urging the stylus 11 toward the measured object is provided to the balancer 13 of the lever-type measuring machine 1. In the lever-type measuring machine 1 according to the present embodiment, particularly in which the balancer 13 is composed of a ceramic, the magnetic biasing device is unlikely to be affected. Furthermore, it is unnecessary to provide a structure to reduce an impact of the balancer 13 on the magnetic biasing device. Thus, the lever-type measuring machine 1 can be provided capable of performing more accurate measurement and having a simple structure.

In addition, there is a case where a magnetic or electrically induced encoder is employed as the displacement detector provided in the lever-type measuring machine 1. In this case, the balancer 13 composed of a ceramic, in particular, can reduce an impact of the displacement detector 14 on measurement results. Thus, the lever-type measuring machine 1 according to the present embodiment can perform more accurate measurement.

In the lever-type measuring machine 1 above, the balancer 13 is composed of a ceramic. Alternatively, any material having high specific flexural rigidity may be used for the balancer 13. For instance, the balancer 13 may be composed of a magnesium alloy, carbon resin, or the like. Similarly, the arm 12 is not limited to a ceramic as well, and may be composed of a magnesium alloy or carbon resin. Furthermore, different materials may be used for the arm 12 and the balancer 13.

Second Embodiment

Figure 2:
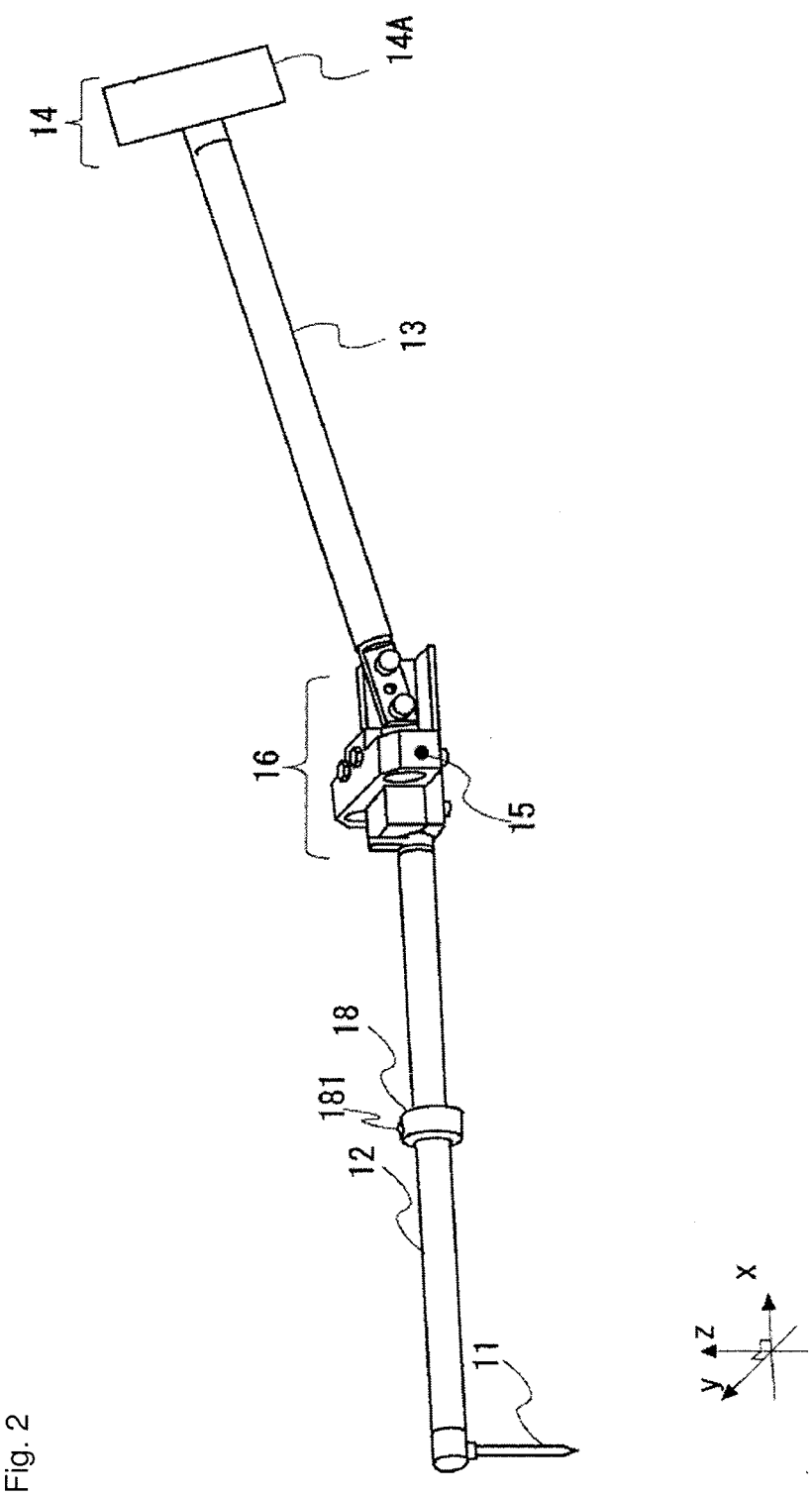
FIG. 2 is a side view of a lever-type measuring machine according to a second embodiment.

A lever-type measuring machine 2 according to the present embodiment further has a weight 18 in addition to the lever-type measuring machine 1 of the first embodiment. FIG. 2 is a side view of the lever-type measuring machine 2 according to the present embodiment. To avoid redundancy in the description below, the elements same as those in the first embodiment are denoted by the same reference numerals and descriptions are omitted appropriately.

The lever-type measuring machine 2 according to the present embodiment has the weight 18 in an intermediate portion of the arm 12. The weight 18 has a thick cylindrical shape. The arm 12 is inserted to a hole of the weight 18, which is fixated to the arm 12 by a screw 181. The weight 18 is not limited to the shape above, and may be provided to the intermediate portion of the arm 12.

With the weight 18, the lever-type measuring machine 2 according to the present embodiment facilitates adjustment of balance between the arm 12 and the balancer 13, and thus can generate a more accurate measurement force.

Third Embodiment

A modified example of a lever-type measuring machine is described below. A lever-type measuring machine 3 according to the present embodiment further has a balance adjustment mechanism (also known as a balance adjuster) in addition to the structure of the lever-type measuring machine 1 of the first embodiment.

FIG. 3(a) is a side view of the lever-type measuring machine 3. The lever-type measuring machine 3 further has a balance adjustment mechanism 17 in addition to the lever-type measuring machine 1 of the first embodiment. The lever-type measuring machine 3 has the stylus 11, the arm 12, the balancer 13, the displacement detector 14, and the balance adjustment mechanism 17.

The balance adjustment mechanism 17 is provided such that the center of gravity is positioned perpendicularly above the rotation supporting point 15 when the arm 12 is parallel with the X axis. The balance adjustment mechanism 17 has a pin 171 and a weight 172. The pin 171 is connected to an upper surface of the joint 16 and is provided so as to define a right angle with the arm 12. Specifically, the pin 171 is provided so as to be parallel with the Z axis when the arm 12 is parallel with the X axis. The weight 172 is provided to an intermediate portion of the pin 171 so as to be movable upward and downward.

The pin 171 specifically has a male thread while the weight 172, which has a thick cylindrical shape, has a female thread in an inner peripheral portion. Raising and lowering the weight 172 allows fine adjustment of the center of gravity of the balance adjustment mechanism 17.

With the balance adjustment mechanism 17, the lever-type measuring machine 3 according to the present embodiment further facilitates counterbalance between the arm 12 and the balancer 13 of the lever-type measuring machine 3, and thus enables more accurate measurement.

In a case, for example, where a crossed spring (not shown in the drawing) is used to support the swing of the rotation supporting point 15, restoration force of the crossed spring increases as inclination of the arm 12 and the balancer 13 increases with respect to the X axis. In other words, the restoration force of the arm 12 and the balancer 13 changes depending on the inclination. The balance adjustment mechanism 17, however, offsets the change in the restoration force of the crossed spring and provides certain measurement force, thus improving accuracy.

FIG. 3(b) is a side view of the lever-type measuring machine 3 in an inclined state. When the lever-type measuring machine 3 inclines, the pin 171 of the balance adjustment mechanism 17 inclines. At this time, the rotation supporting point 15 and the center of gravity O of the balance adjustment mechanism 17 are not aligned in the perpendicular direction. Then, a torque is exerted on the arm 12 centering the rotation supporting point 15 due to self-weight of the balance adjustment mechanism 17 such that the angle of the inclination of the arm 12 deepens relative to the X-axis direction. The torque generated by the self-weight of the balance adjustment mechanism 17 offsets the displacement of the restoration force of the crossed spring at the swing supporting point.

Figure 4:
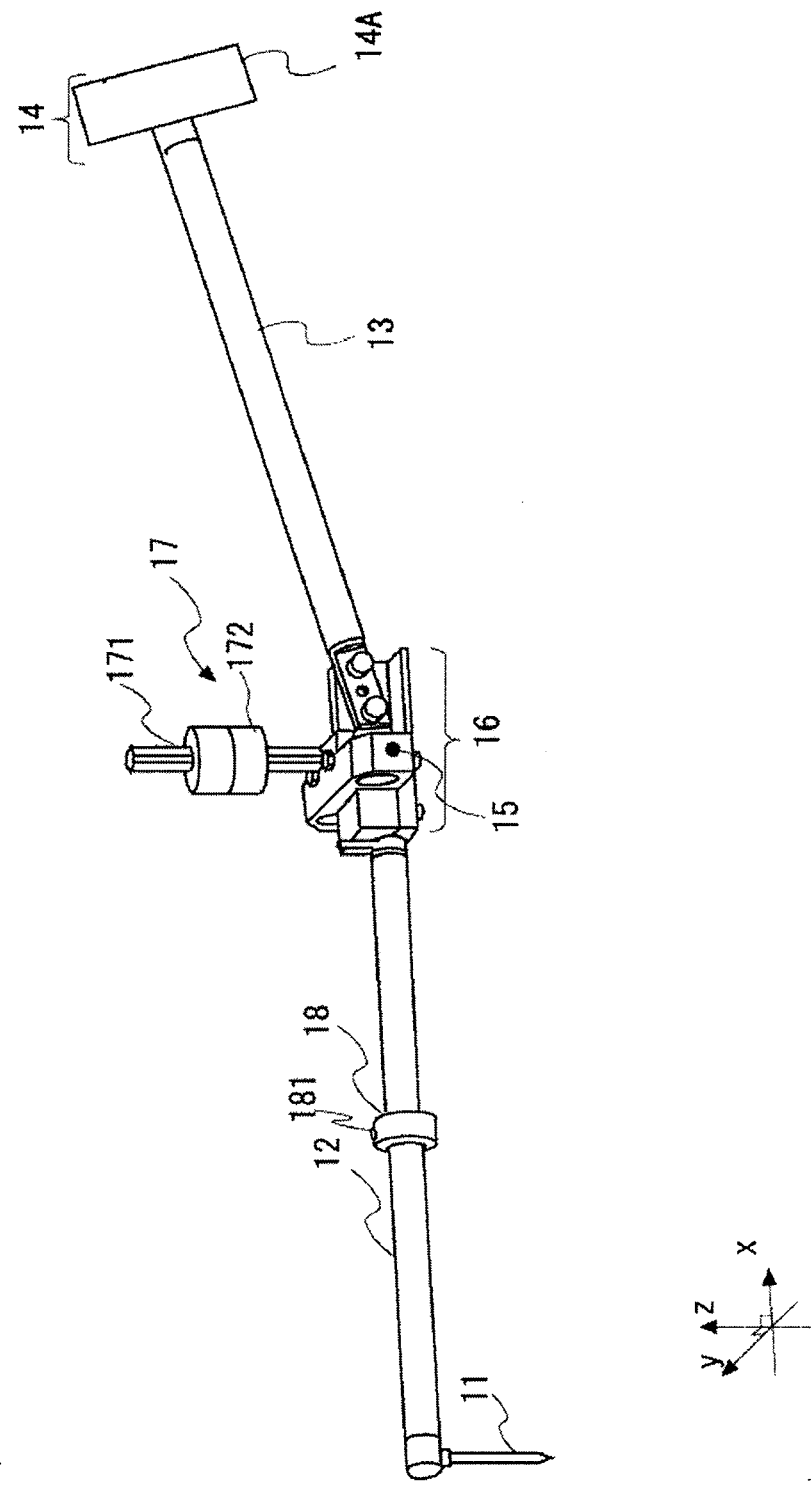
FIG. 4 is a side view of a lever-type measuring machine according to a fourth embodiment.

The lever-type measuring machine 2 has the weight 18 while the lever-type measuring machine 3 has the balance adjustment mechanism 17. Both the weight 18 and the balance adjustment mechanism 17 may be provided as shown in FIG. 4. A lever-type measuring machine 4 has the balance adjustment mechanism 17 and the weight 18. This further facilitates counterbalance between the arm 12 and the balancer 13, and provides a lever-type measuring machine having good responsiveness relative to a measured surface.

Figure 5:
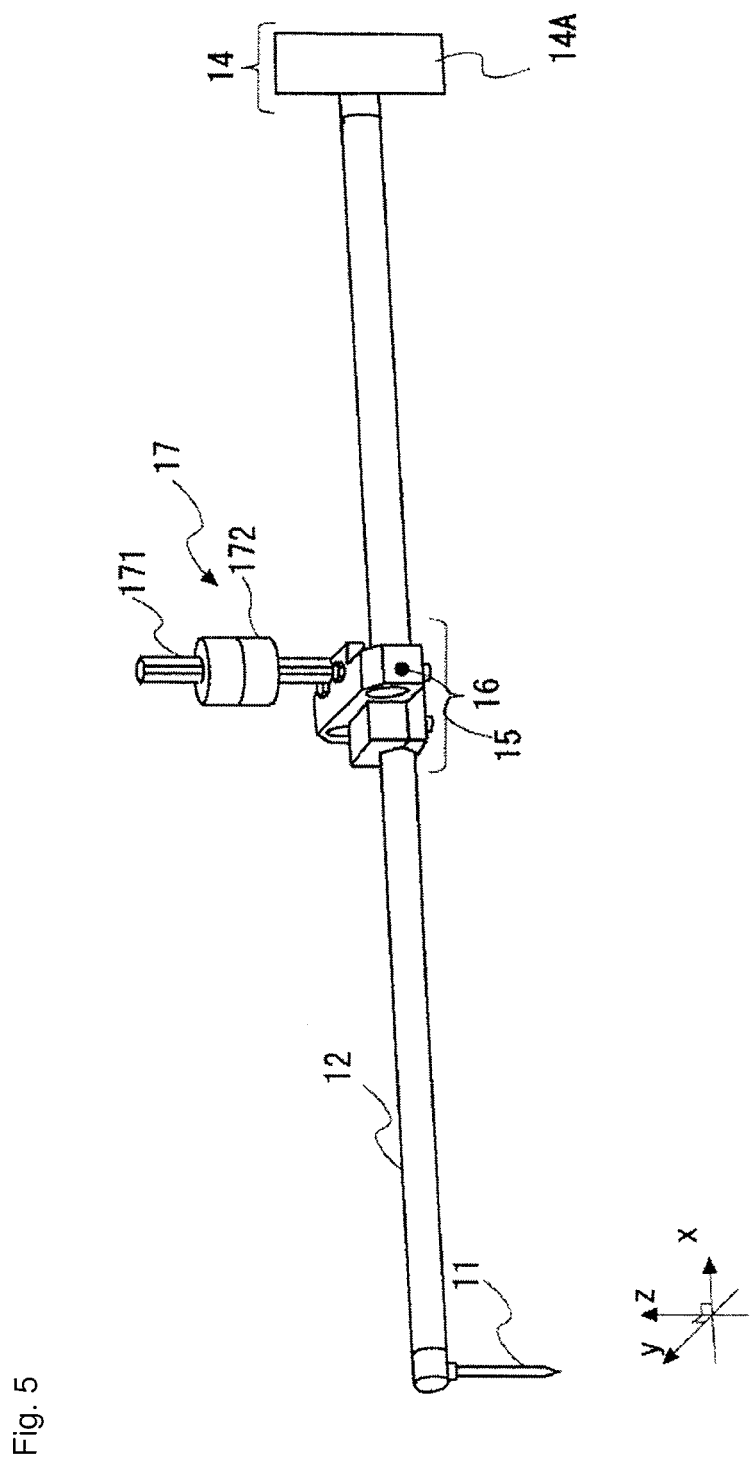
FIG. 5 is a side view of a modified example of the lever-type measuring machine according to the third embodiment.

The present invention is not limited to the embodiments above and may be changed appropriately within a scope not deviating from the concept. In the embodiments above, the arm and the balancer are separate members. Alternatively, the arm 12 and the balancer 13 may be an integrally formed one-piece member (i.e., a one-piece member unitarily formed as a single unit) as in a lever-type measuring machine 5 shown in FIG. 5. Furthermore, a length ratio of the arm and the balancer is not limited to one to one. For instance, the length of the balancer may be approximately a half of the length of the arm.

Furthermore, in the embodiments above, the stylus 11 is provided perpendicular to the arm 12. The stylus 11 may be provided vertically to the arm 12 and a plurality of styluses 11 may be provided.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A lever-type measuring machine swinging around a supporting point, comprising:
 a stylus configured to measure a shape of a measured object;
 an arm having a first end connected to the stylus and a second end connected to the supporting point; and
 a balancer having a first end connected to the supporting point and formed of a material having a high specific flexural rigidity.

2. The lever-type measuring machine according to claim 1, wherein the material having high specific flexural rigidity is a material having specific flexural rigidity greater than that of aluminum.

3. The lever-type measuring machine according to claim 1, wherein the balancer comprises one of a ceramic, a carbon resin, and a magnesium alloy.

4. The lever-type measuring machine according to claim 1, wherein the arm comprises one of a ceramic, a carbon resin, and a magnesium alloy.

5. The lever-type measuring machine according to claim 1, wherein the arm and the balancer together are a unitarily-formed one-piece member.

6. The lever-type measuring machine according to claim 1, further comprising a balance adjuster at the supporting point.

7. The lever-type measuring machine according to claim 6, wherein the balance adjuster comprises:
 - a support pillar connected in a generally perpendicular direction above the supporting point to generally create a right angle with the arm; and
 - a weight provided at the intermediate portion of the support pillar.

8. The lever-type measuring machine according to claim 1, further comprising a weight provided at an intermediate portion of the arm.

9. The lever-type measuring machine according to claim 1, further comprising a weight provided at an intermediate portion of the balancer.

\* \* \* \* \*